United States Patent
Lieb et al.

(10) Patent No.: US 12,546,634 B2
(45) Date of Patent: Feb. 10, 2026

(54) SENSOR UNIT

(71) Applicant: elobau GmbH & Co. KG, Leutkirch (DE)

(72) Inventors: Andreas Lieb, Bad Wurzach (DE); Wolfgang Keller, Rettenberg (DE)

(73) Assignee: elobau GmbH & Co. KG, Leutkirch (DE)

( * ) Notice: Subject to any disclaimer, the term of this patent is extended or adjusted under 35 U.S.C. 154(b) by 281 days.

(21) Appl. No.: 18/368,224

(22) Filed: Sep. 14, 2023

(65) Prior Publication Data

US 2024/0110818 A1 Apr. 4, 2024

(30) Foreign Application Priority Data

Sep. 29, 2022 (DE) ...................... 20 2022 105 508.4

(51) Int. Cl.
*G01D 11/30* (2006.01)

(52) U.S. Cl.
CPC .................................... *G01D 11/30* (2013.01)

(58) Field of Classification Search
CPC ....................................................... G01D 11/30
See application file for complete search history.

(56) References Cited

U.S. PATENT DOCUMENTS

| | | | | |
|---|---|---|---|---|
| 2016/0025222 A1* | 1/2016 | Buchholz | ........... | G01N 27/4078 73/23.31 |
| 2016/0279358 A1 | 9/2016 | Singer | | |
| 2017/0184499 A1* | 6/2017 | Höhne | ................. | G01N 21/643 |
| 2018/0348022 A1 | 12/2018 | Ushiro et al. | | |
| 2020/0000348 A1 | 1/2020 | Bartosch | | |

FOREIGN PATENT DOCUMENTS

| | | | | |
|---|---|---|---|---|
| CN | 100483121 C | * | 4/2009 | |
| DE | 19739435 A1 | * | 3/1999 | ......... G01N 27/4078 |
| DE | 102006001610 A1 | * | 7/2007 | ............ B01F 35/513 |
| DE | 102006001610 B4 | * | 6/2009 | ............. G01D 11/30 |
| DE | 202011051244 U1 | * | 9/2011 | ........... G01D 11/245 |
| DE | 202011109319 U1 | * | 3/2013 | ............. G01D 11/30 |

(Continued)

OTHER PUBLICATIONS

European Search Report for European Patent Application EP 23 189 468.4, dated Nov. 27, 2023.

(Continued)

*Primary Examiner* — Jamel E Williams
(74) *Attorney, Agent, or Firm* — Notaro, Michalos & Zaccaria P.C.

(57) ABSTRACT

A sensor unit for a penetrating connection to an installation wall of a hygiene-critical technical installation. The sensor unit has a passage end located inside a hygiene area of the technical installation when in use, a hygiene cover for the passage end, and a connecting device for force-locking connection between hygiene cover and installation wall. The connecting device has an external thread on the sensor unit, at least one union nut, and an internal thread on a cover interior of the hygiene cover. The cover interior is formed by a closed-surface, circular front wall and a closed circumferential wall extending axially therefrom. The circumferential wall at its end axially opposite to the front wall has a connecting surface with an axial seal for abutment against the installation wall.

8 Claims, 2 Drawing Sheets

(56) References Cited

FOREIGN PATENT DOCUMENTS

| | | | | |
|---|---|---|---|---|
| DE | 102012210700 A1 * | 1/2014 | ............ | F16B 33/004 |
| DE | 102013222594 A1 * | 9/2014 | ........... | F01N 13/008 |
| DE | 102016103750 A1 * | 6/2017 | ........... | G01N 21/645 |
| DE | 10 2018 102905 A1 | 12/2018 | | |
| DE | 102020106829 A1 * | 9/2021 | ............. | G01D 11/30 |
| EP | 2322811 A1 * | 5/2011 | ............. | F16B 9/056 |
| EP | 2868314 A1 * | 5/2015 | ................ | A61P 3/10 |
| FR | 3085065 A1 * | 2/2020 | ........... | F16L 19/025 |
| WO | WO-2021080918 A1 * | 4/2021 | ........... | G01D 11/245 |

OTHER PUBLICATIONS

German Search Results for German Priority Application No. DE 20 2022 105 508.4, dated May 30, 2023.

\* cited by examiner

SENSOR UNIT

CROSS REFERENCE TO RELATED APPLICATION

This patent application claims the benefit of and priority to German Utility Model Patent Application No. 20 2022 105 508.4, filed on Sep. 29, 2022, the disclosure of which is incorporated by reference herein in its entirety as part of the present disclosure.

FIELD

The present invention relates to a sensor unit for penetrating connection to an installation wall of a hygiene-critical technical installation comprising a passage end located inside a hygiene area of the technical installation when in use, a hygiene cover for the passage end and a connecting device for force-locking connection between hygiene cover and installation wall.

BACKGROUND

In hygiene-critical areas such as food or pharmacy production, the components coming in contact with the produced products be able to be reliably cleaned and have the lowest possible contamination potential. Moving parts are frequently located in these hygiene-critical areas such as cutting tools for preparation and cutting of foodstuffs or transport components such as gripper arms for moving the products. In order to reduce the risk of injury to an operator, these areas are frequently provided with light barriers or housings or access flaps whose closed state is detected by means of safe-keeping or distance sensor units. These sensor units are used to limit the movement of transport components.

Sensor units of this type are known from the prior art which are installed separate from the hygiene-critical area by means of a closed wall since these sensor units do not comply with the hygiene regulations. This blind installation makes it difficult to achieve installation and alignment between receiver and emitter of such a sensor unit. Also not all sensor units can be installed blind.

Furthermore, sensor units are known from the prior art which comply with the respective hygiene specifications and may thus be installed within a corresponding hygiene area. However, such sensors are complex and cost-intensive to manufacture. In addition, an expensive cleaning is frequently required, which increases the risk of damage to the sensor units.

SUMMARY

It is therefore the object of the present invention to propose a simple, cost-effective and modulatable sensor unit for a hygiene-critical technical installation.

This object is achieved by a sensor unit for penetrating connection to an installation wall of a hygiene-critical technical installation comprising a passage end located inside a hygiene area of the technical installation when in use, further comprising a hygiene cover for the passage end and a connecting device for force-locking connection between hygiene cover and installation wall, wherein the connecting device has an external thread on the sensor unit, at least one union nut and an internal thread on a cover interior of the hygiene cover, wherein the cover interior is formed by a closed-surface, circular front wall and a closed circumferential wall extending axially therefrom, wherein the circumferential wall at its end axially opposite to the front wall has a connecting surface with an axial seal for abutment against the installation wall.

The sensor unit is in particular a commercially available security sensor or distance sensor without particular properties required for use in a hygiene area. In other words, the invention makes it possible to use "normal" sensor units in these hygiene areas. The sensor recording of measurement data is accomplished magnetically or inductively according to the invention. Such sensor units have a substantially cylindrical sensor housing with a passage end and an external thread. The threads that can be used particularly advantageously for the invention are M8, M12 or M30 threads. However, other thread sizes and types are also according to the invention, in particular fine threads. The latter make it possible to have an equally force-locking connection in a smaller installation space than standard threads. Such a fine thread is arranged according to the invention at least in the region of the passage end. The hygiene cover is designed so that when in use it is connected to the sensor unit at least by means of two, preferably by means of three thread turns.

The passage end forms a maximum fraction of 50%, preferably a maximum of 30%, particularly preferably a maximum of 15% of the axial extension of the sensor unit in order to thus keep the installation space inside the hygiene area as small as possible.

An outer surface of the hygiene cover according to the invention complies with the required standard in the hygiene area and additionally prevents direct contamination of the sensor unit.

As a result of the threaded connection, the hygiene cover of the commercially available sensor unit according to the invention enables a wide range of use of the sensor unit regardless of its positioning within the technical installations which in turn reduces costs and increases the opportunities for use. The axial position of the sensor unit according to the invention with hygiene cap in relation to the penetrated wall of the hygiene-critical installation is achieved by the first union nut which prevents the passage end from penetrating too deeply and ensures correct re-attachment after a cleaning. Specially trained staff are therefore not required for the cleaning.

The force-locking connection between hygiene cover and installation wall is accomplished by means of a clamping of the installation wall between the first union nut and the hygiene cover, wherein these are each connected force-locked to the sensor unit. The installation wall has a through-opening in the form of a circular bore adapted to the geometric shape of the sensor unit. A different shape of the through opening is also inventive as long as its smallest diameter/width is greater than the external diameter of the sensor unit and smaller than the external diameter of the union nut and the hygiene cover.

The front wall and the circumferential wall substantially form a cylinder that is open on one side on the front side. The axial seal is pressed against the installation wall so that a seal having a dust and water resistance is ensured between hygiene cover and installation wall. The axial seal is configured according to the invention as a sealing ring, flat seal or as a labyrinth seal.

In one embodiment of the invention, it is provided that the connecting device has a second union nut and the hygiene cover has an axially extending cover section with an enlarged radius for receiving the second union nut in the cover interior. A fixed positioning of the sensor unit on the installation wall is advantageously thereby ensured even when removing the hygiene cover for cleaning purposes. After cleaning the hygiene cover is again connected force-locked to the installation wall, no re-positioning of the sensor unit being required. The passage end can then be positioned axially continuously. The cover section has no internal thread and a diameter greater than or equal to the maximum diameter of the union nut. The second union nut has such an extension in the axial direction that a secure mounting on the sensor unit is ensured by means of at least three thread turns.

Furthermore, the axial extension of the cover interior is advantageously greater than that of the passage end. Insofar as the connecting device has the second union nut, an air gap is formed both between the passage end and the front-wall side cover interior and also between a front surface of the second union nut and the cover section, which ensures a force-locking and sealing connection between installation wall and hygiene cover. A continuous axial positioning of the passage end in the hygiene area is possible as far as the extent delimited by the hygiene cover. The air gap between passage end and the cover interior on the front surface side advantageously prevents the direct transfer of external forces to the sensor unit in particular due to the impact of an emitter or another component of the technical installation, with the result that the sensor unit is protected and its lifetime is increased.

In a further development of the invention, it is provided that the front wall has a maximum thickness of 5 mm, preferably of 3 mm, particularly preferably of 1 mm. Such a small thickness of the front wall reduces the required installation space and damps the range of the sensor unit as little as possible.

In one embodiment of the invention it is provided that an outer surface formed by the front wall and the circumferential wall has no sharp edges, in particular has exclusively radii and/or the outer surface has a cylinder shape configured to be radially at least single-staged and/or has an at least partially formed key surface. In particular, edges having an acute angle, i.e. of up to 90° between contacting surfaces are defined as sharp edges. The radii are at least 0.5 mm, preferably at least 1 mm, particularly preferably at least 2 mm. The cylinder shape is the most space-saving structure of the hygiene cover. The outer surface is adapted to the contour of the cover interior. In addition to a partially formed key surface, two, three or a plurality of key surfaces can be formed, wherein the corresponding key surfaces are arranged uniformly in a circular arc defined by the front surface. The key surfaces are preferably arranged at an angle of 90° to the front surface along the circumferential surface and enable a jaw spanner to be used free from damage during mounting and dismounting. The key surfaces have a maximum axial height of 15 mm, preferably 10 mm, particularly preferably 5 mm. The hygiene cover is tightened by greater than 5 Nm, preferably greater than 7 Nm, particularly preferably greater than 10 Nm and in particular by hand.

In one embodiment of the invention it is provided that the outer shell is made of highly alloyed steel, in particular a stainless steel. Highly alloyed steels are particularly corrosion-resistant, have a smooth surface and a high strength so that even aggressive cleaning agents can be used, especially as only small adhesions to the surface are possible due to the material. The high strength of the material advantageously makes it possible to have a thin outer shell of the hygiene cover which does not substantially minimize the range of the sensor unit.

BRIEF DESCRIPTION OF THE DRAWINGS

The invention is described in detail hereinafter with reference to several exemplary embodiments by means of the figures, wherein.

DETAILED DESCRIPTION

Figure 1:
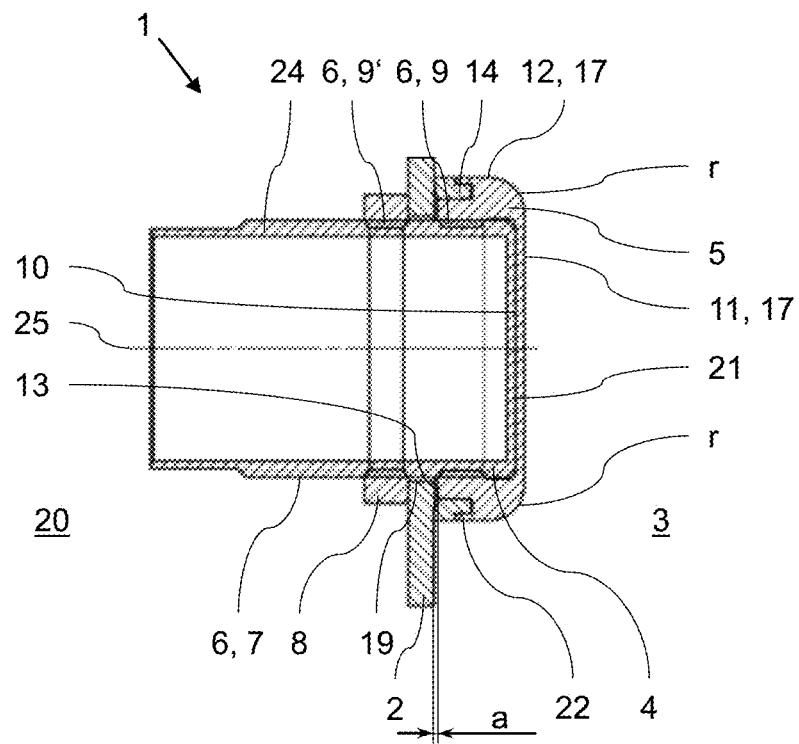
FIG. 1 shows a first sectional view of the sensor unit at an installation wall.

FIG. 1 shows a first sectional view of the sensor unit 1 with a sensor housing 24 on an installation wall 2, wherein the installation wall 2 is formed of steel sheet, in particular a stainless steel sheet and for reasons of representation is shown shortened. The installation wall extends perpendicular to the sensor unit axis 25 in both directions and separates a hygiene area 3 from an installation area 20. The installation wall 2 can have a coating on its hygiene-area side. The installation wall 2 has a circular through opening 19 which is penetrated by the sensor housing 24, wherein sensor housing 24 and installation wall 2 do not contact one another. The sensor housing 24 in particular has an external thread 7 over its entire circumference, which is configured to be continuous both at the passage end 4 and also in an installation area 20 and inside the through-opening 19. In the installation area 20 a first union nut 8 is screwed on the sensor housing 24 which limits the axial extension of the passage end 4 into the hygiene area 3. In this area the hygiene cover 5 according to the invention is screwed fully onto the passage end 4 and thus contacts the front surface 21 of the sensor housing 24 with its cover interior 10 on the front wall side. The direct abutment of the hygiene cover 5 on the front surface 21 brings about a small switching distance and a small installation space. Sensor housing 24 and hygiene cover 5 are force-locked connected to one another via a threaded connection 7, 9 wherein the hygiene cover 5 has an internal thread 9 matched accordingly to the external thread 7 of the sensor housing 24 in its cover interior 10. An axial seal 14 is arranged on a connecting surface 13 axially opposite a front wall 11, which is fastened positively to the hygiene cover 5 via a sealing lug 22. A circumferential wall 12 extends from the front wall 11 which together form an outer shell 17. The sealing lug 22 is configured as a circumferentially closed sealing web or as at least an elevation, wherein in the case of a plurality of sealing lugs 22 configured as elevations, these are advantageously distributed radially uniformly on the hygiene cover 5. The axial seal 14 abuts against the installation wall 2 and forms a force-locking tight connection with this. A distance a is formed between connecting surface 13 and installation wall 2 so that the clamping force applied by the threaded connection is transferred exclusively via the axial seal. It is also advantageous that installation wall 2 and connecting surface 13 contact one another in one case of usage, i.e. a=0 mm to produce a stop for a maximum pressing of the axial seal 14 and thereby protect the axial seal 14 from damage. The outer surface 17 has no sharp edges but only straight surfaces and radii r in order to create a surface that is as easy as possible to clean. A connecting device 6 is formed from the external thread 7, the first union nut 8 with an internal thread 9' and the internal thread 9.

Figure 2:
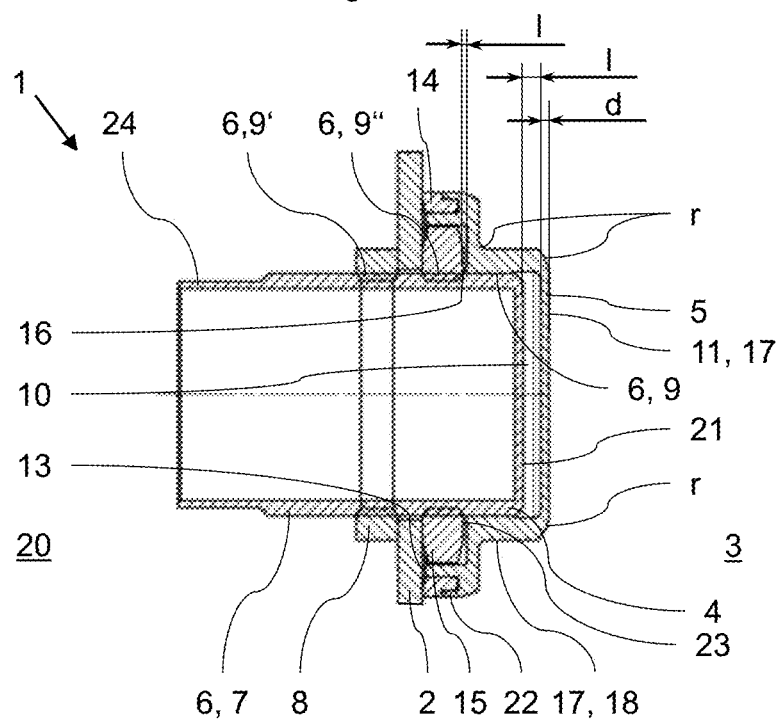
FIG. 2 shows a second sectional view of the sensor unit at an installation wall.

FIG. 2 shows a second sectional view of the sensor unit 1 on an installation wall 2, wherein here additionally to the components shown in FIG. 1, a second union nut 15 is arranged in the cover interior 10 on the sensor housing 24, wherein an internal thread 9″ of the second union nut 15 is part of the connecting device 6. The first union nut 8 whose internal thread 9′ is also part of the connecting device 6 abuts against the installation wall 2 in the installation area 20 and delimits the axial extension of the passage end 4 by the force-locking connection to the external thread 7 of the sensor housing 24. Further, the connecting device 6 also includes the internal thread 9 of the hygiene cover 5. The second union nut 15 abuts against the installation wall 2 in the hygiene area 3 and is likewise connected force-locked to the sensor housing 24. This is therefore radially and axially fixed on the installation wall 2 via the two union nuts 8, 15. Thus, respectively one air gap 1 is formed both between the front-wall-side cover interior 10 and the front surface 21 and also between the nut front surface 23 of the second union nut 15 opposite the installation wall 2 and a cover section 16 of the cover interior 10 so that the clamping force produced by the connecting device 6 between sensor housing 24 and hygiene cover 5 acts exclusively in the area of the connecting surface 13 and the axial seal 14 to the installation wall 2. In this embodiment the axial seal 14 is fixed positively via a sealing lug 22 on the hygiene cover 5. The outer surface 17 of the hygiene cover 5 has a key surface 18 wherein this is delimited by radii r and unsharp edges, i.e. edges having at least one obtuse angle. The formation of a key surface 18 facilitates the dismounting and mounting of the hygiene cover 5. The cover interior 10 is configured in such a manner that the second union nut 15 in the cover section 16 is accommodated therein wherein the maximum external diameter of the second union nut 15 is less than or equal to the internal diameter of the cover section 16. A thickness d of the front wall 11 is preferably as small as possible so that the installation space and the damping of the signals of the sensor unit are small.

Figure 3:
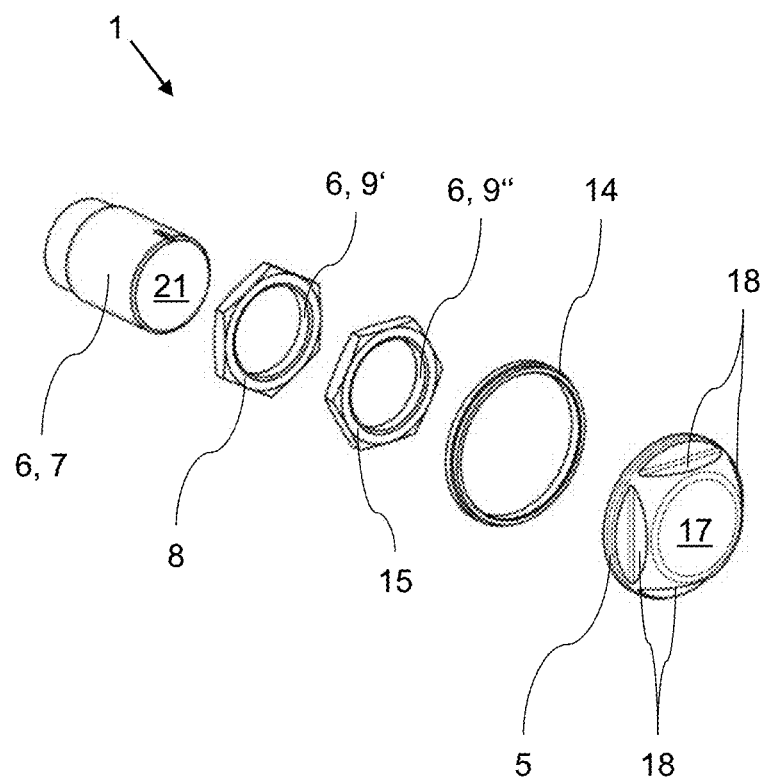
FIG. 3 shows a perspective exploded view of the sensor unit.

FIG. 3 shows a perspective exploded view of the sensor unit 1, wherein the outer surface 17 of the sensor unit 1 has two pairs of key surfaces 18 offset by 90° with respect to one another, wherein the key surfaces 18 of one pair are each opposite one another. The key surfaces 18 are delimited by radii r or by obtuse edges. The first and second union nuts 8, 15 have an identical internal thread 9′, 9″ which are each configured for a force-locking connection to the external thread 7 of the sensor unit 1 and form part of the connecting device 6. The sensor unit 1 has a continuous external thread 7 from its front surface 21. The axial seal 14 is arranged in such a manner on the outer surface 17 of the hygiene cover 5 that these terminate radially with one another and thus no sharp edges and/or contours are formed which potentially make cleaning difficult or are dirt-adhering. The hygiene cover 5 has substantially the form of an axially two-step cylinder.

REFERENCE LIST

The following is the reference number list:
1. Sensor unit
2. Installation wall
3. Hygiene area
4. Passage end
5. Hygiene cover
6. Connecting device
7. External thread
8. First union nut
9, 9′, 9″ Internal thread
10. Cover interior
11. Front wall
12. Circumferential wall
13. Connecting surface
14. Axial seal
15. Second union nut
16. Cover section
17. Outer surface
18. Key surface
19. Through opening
20. Installation area
21. Front surface
22. Sealing lug
23. Nut front surface
24. Sensor housing
25. Sensor unit axis
d Thickness
r Radius
a Distance
l Air gap

We claim:

1. A sensor unit (1) for a penetrating connection to an installation wall (2) of a hygiene-critical technical installation, comprising:
   a substantially cylindrical sensor housing (24) having an external thread (7);
   a passage end (4) located inside a hygiene area (3) of the technical installation when in use;
   a hygiene cover (5) for the passage end (4); and
   a connecting device (6) for force-locking connection between hygiene cover (5) and installation wall (2);
   wherein the connecting device (6) comprises the external thread (7) on the sensor housing (24), at least one first union nut (8), and an internal thread (9) on a cover interior (10) of the hygiene cover (5);
   wherein the cover interior (10) is formed by a closed-surface, circular front wall (11) and a closed circumferential wall (12) extending axially therefrom;
   wherein the circumferential wall (12) at its end axially opposite to the front wall (11) has a connecting surface (13) with an axial seal for abutment against the installation wall (2); and
   wherein the at least one first union nut (8) is mounted to the external thread (7) in an installation area (20), the installation area (20) outside of the hygiene area (3).

2. A sensor unit (1) for a penetrating connection to an installation wall (2) of a hygiene-critical technical installation, comprising:
   a passage end (4) located inside a hygiene area (3) of the technical installation when in use;
   a hygiene cover (5) for the passage end (4); and
   a connecting device (6) for force-locking connection between hygiene cover (5) and installation wall (2);
   wherein the connecting device (6) has an external thread (7) on the sensor unit (1), at least one union nut (8), and an internal thread (9) on a cover interior (10) of the hygiene cover (5);
   wherein the cover interior (10) is formed by a closed-surface, circular front wall (11) and a closed circumferential wall (12) extending axially therefrom;
   wherein the circumferential wall (12) at its end axially opposite to the front wall (11) has a connecting surface (13) with an axial seal for abutment against the installation wall (2); and
   wherein the connecting device (6) has a second union nut and the hygiene cover (5) has an axially extending cover section (16) with an enlarged radius for receiving the second union nut (15) in the cover interior (10).

3. The sensor unit (1) according to claim 1, wherein the axial extension of the cover interior (10) is greater than that of the passage end (4).

4. The sensor unit (1) according to claim 1, wherein the front wall (11) has a maximum thickness (d) of 5 mm.

5. The sensor unit (1) according to claim 1, wherein the front wall (11) has a maximum thickness (d) of 3 mm.

6. The sensor unit (1) according to claim 1, wherein the front wall (11) has a maximum thickness (d) of 1 mm.

7. The sensor unit (1) according to claim 1, wherein the front wall (11) and the circumferential wall (12) form an outer surface (17) that has no sharp edges.

8. The sensor unit (1) according to claim 7, wherein the outer surface (17) has a radii (r).

* * * * *